(12) United States Patent
Liu

(10) Patent No.: US 6,338,099 B1
(45) Date of Patent: Jan. 8, 2002

(54) DEVICE CODE RECOGNIZING CIRCUIT

(75) Inventor: Thomas Liu, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 09/349,376

(22) Filed: Jul. 9, 1999

(51) Int. Cl.[7] .............................................. G06F 1/00
(52) U.S. Cl. ........................................................ 710/3
(58) Field of Search ............................ 710/3; 340/5, 1

(56) References Cited

U.S. PATENT DOCUMENTS

| | | | | |
|---|---|---|---|---|
| 3,668,561 A | * | 6/1972 | Hornung ........................ 710/3 |
| 4,327,353 A | * | 4/1982 | Beard et al. .................. 340/5.3 |
| 4,471,352 A | * | 9/1984 | Soulliard et al. .......... 340/7.28 |
| 4,670,747 A | * | 6/1987 | Bovras et al. ......... 340/825.56 |
| 4,686,912 A | * | 8/1987 | Fogleman et al. ........ 109/59 T |
| 4,859,990 A | * | 8/1989 | Isaacman .................... 340/539 |
| 4,908,604 A | * | 3/1990 | Jacob .......................... 340/539 |
| 5,198,707 A | * | 3/1993 | Nicolai ........................ 326/98 |
| 5,203,004 A | * | 4/1993 | Bunton et al. .............. 713/340 |
| 5,412,291 A | * | 5/1995 | Payne et al. ................ 318/102 |
| 5,457,411 A | * | 10/1995 | Hastings ....................... 326/59 |
| 5,477,166 A | * | 12/1995 | Matthews ..................... 326/38 |
| 5,610,537 A | * | 3/1997 | Hastings ....................... 326/59 |
| 5,629,635 A | * | 5/1997 | Reno ............................ 326/38 |
| 5,867,107 A | * | 2/1999 | Gartner ..................... 340/5.31 |
| RE36,443 E | * | 12/1999 | Ma et al. ...................... 326/39 |
| 6,127,851 A | * | 10/2000 | Boice et al. ................ 326/101 |
| 6,134,686 A | * | 10/2000 | Jha ............................. 714/724 |

* cited by examiner

Primary Examiner—William M. Treat
(74) Attorney, Agent, or Firm—Rosenberg, Klein & Lee (57) ABSTRACT

A device code recognizing circuit includes a microprocessor forming an array having input pins and output pins and a code generation circuit connected to the microprocessor. The code generation circuit includes signal input terminals connected to input pins of the array and signal output terminals connected to I/O terminals of the microprocessor. The signal output terminals are sequentially and selectively set to one of low level condition and high impedance condition. The input pins of the microprocessor to which the signal input terminals of the code generation circuit are connected serially read signals from the code generation circuit for provision the signals to the microprocessor to form a device code associated therewith.

10 Claims, 8 Drawing Sheets

DEVICE CODE RECOGNIZING CIRCUIT

FIELD OF THE INVENTION

The present invention generally relates to a circuit for generating and recognizing a serial ID code of a device, and in particular to a processor-based circuit capable to recognize a device code with a simplified circuit structure.

BACKGROUND OF THE INVENTION

Figure 8:
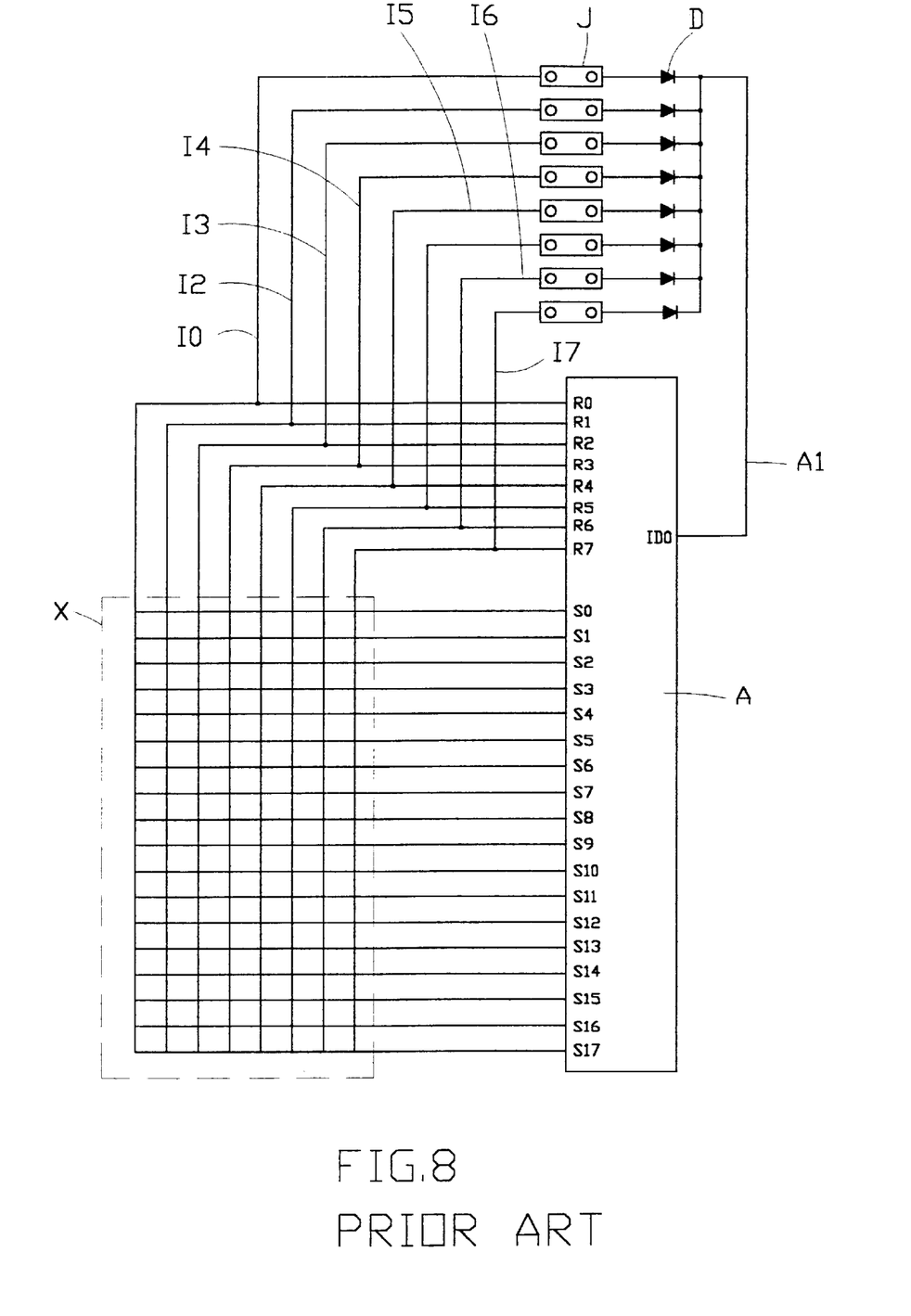
FIG. 8 is a conventional device code recognizing circuit.

Processor-based electronic devices and peripheral devices associated therewith are usually provided with a device code to be read and recognized by processors thereof for identification purposes in order to establish proper data connection therebetween. FIG. 8 of the attached drawings shows an example of a conventional device code recognizing circuit which makes use of a number of jumpers (J) and diodes (D) serially connected between an I/O terminal (A1) and a key array (X) of a microprocessor (A). In the example shown in FIG. 8, eight sets of jumpers (J) and diodes (D) are used and respectively connected to eight input terminals (I0–I7) of the key array (X). The I/O terminal (A1) sequentially sends out high and low signals for being read by the input terminals (I0–I7) and thus there are $2^8=256$ possible combinations of code. However, since the I/O terminal (A1) is connected to the input terminals (I0–I7), there must be diodes (D) therebetween in order to avoid undesired currents therethrough and prevent interference with the regular input function of the input terminals (I0–I7) serving as part of the key array (X). The more input terminals (I0–I7) used, the more diodes (D) are needed. This increases not only costs but also complexity of the circuit.

Figure 9:
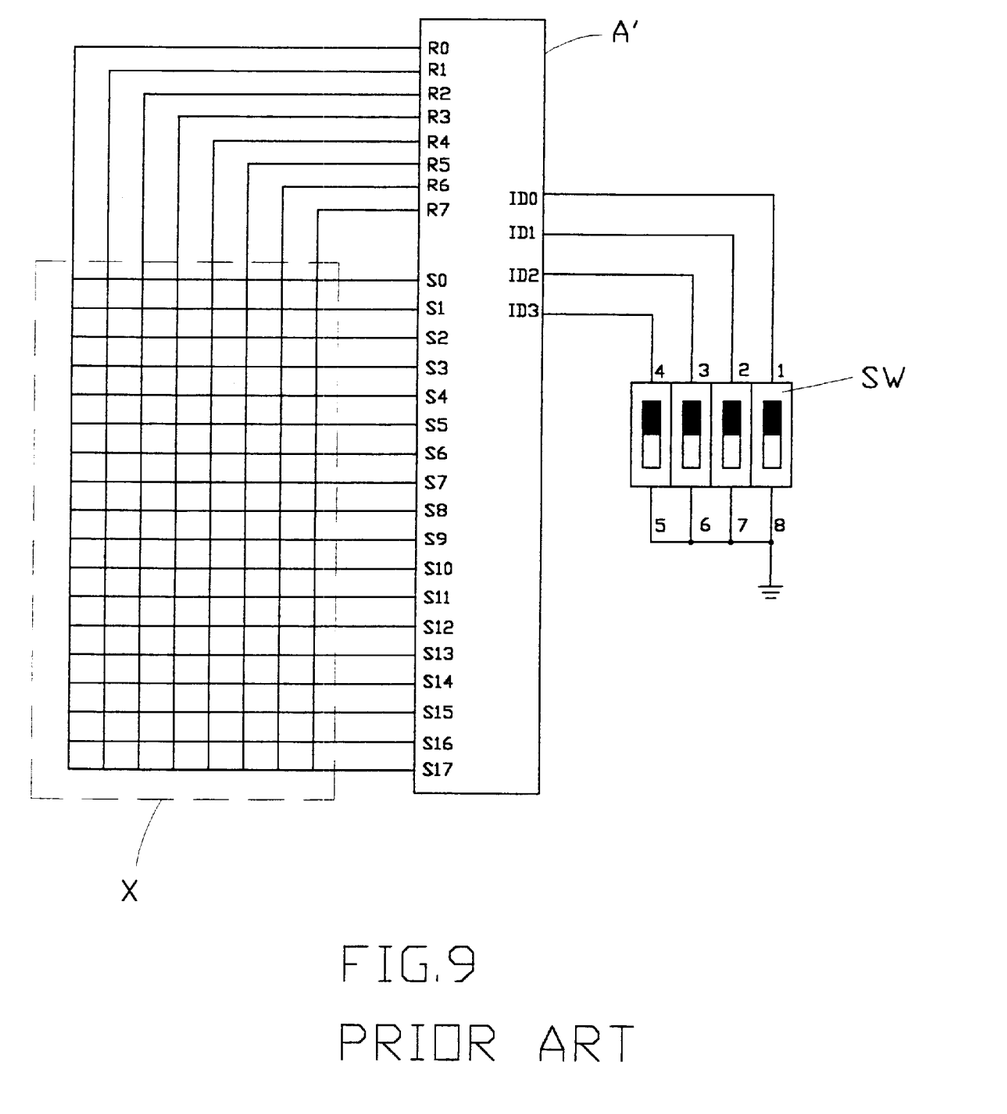
FIG. 9 is another conventional device code recognizing circuit.

FIG. 9 shows another example of the conventional device code recognizing circuited wherein four I/O terminals (ID0–ID3) of a microprocessor (A') are respectively connected with switches (SW). The switches (SW) allows user's setting of the device code. No connection between the I/O terminals (ID0–ID3) and the input terminals (R0–R7) is needed thereby eliminating the current problem encountered in the example of FIG. 8 and simplifying the structure of the circuit. However, the number of combinations of code is limited to only $2^4=16$. To increase the number of possible code combination, additional terminals of the microprocessor (A') must be used and this imposes additional limitation to the utilization of the microprocessor (A').

Thus, it is desired to have a device code recognizing circuit which overcomes the problems encountered in the prior art.

SUMMARY OF THE INVENTION

Accordingly, an object of the present invention is to provide a device code recognizing circuit having a simple structure but providing the largest number of possible code combinations.

Another object of the present invention is to provide a device code recognizing circuit capable to provide the largest number of possible code combinations with the least number of terminals of a microprocessor.

A further object of the present invention is to provide a device code recognizing circuit wherein generation of a device code associated therewith does not interfere with the regular operation of the device.

To achieve the above objects, in accordance with the present invention, there is provided a device code recognizing circuit comprising a microprocessor forming an array having input pins and output pins and a code generation circuit connected to the microprocessor. The code generation circuit includes signal input terminals connected to input pins of the array and signal output terminals connected to I/O terminals of the microprocessor. The signal output terminals are sequentially and selectively set to one of low level condition and high impedance condition. The input pins of the microprocessor to which the signal input terminals of the code generation circuit are connected serially read signals from the code generation circuit for provision the signals to the microprocessor to form a device code associated therewith.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
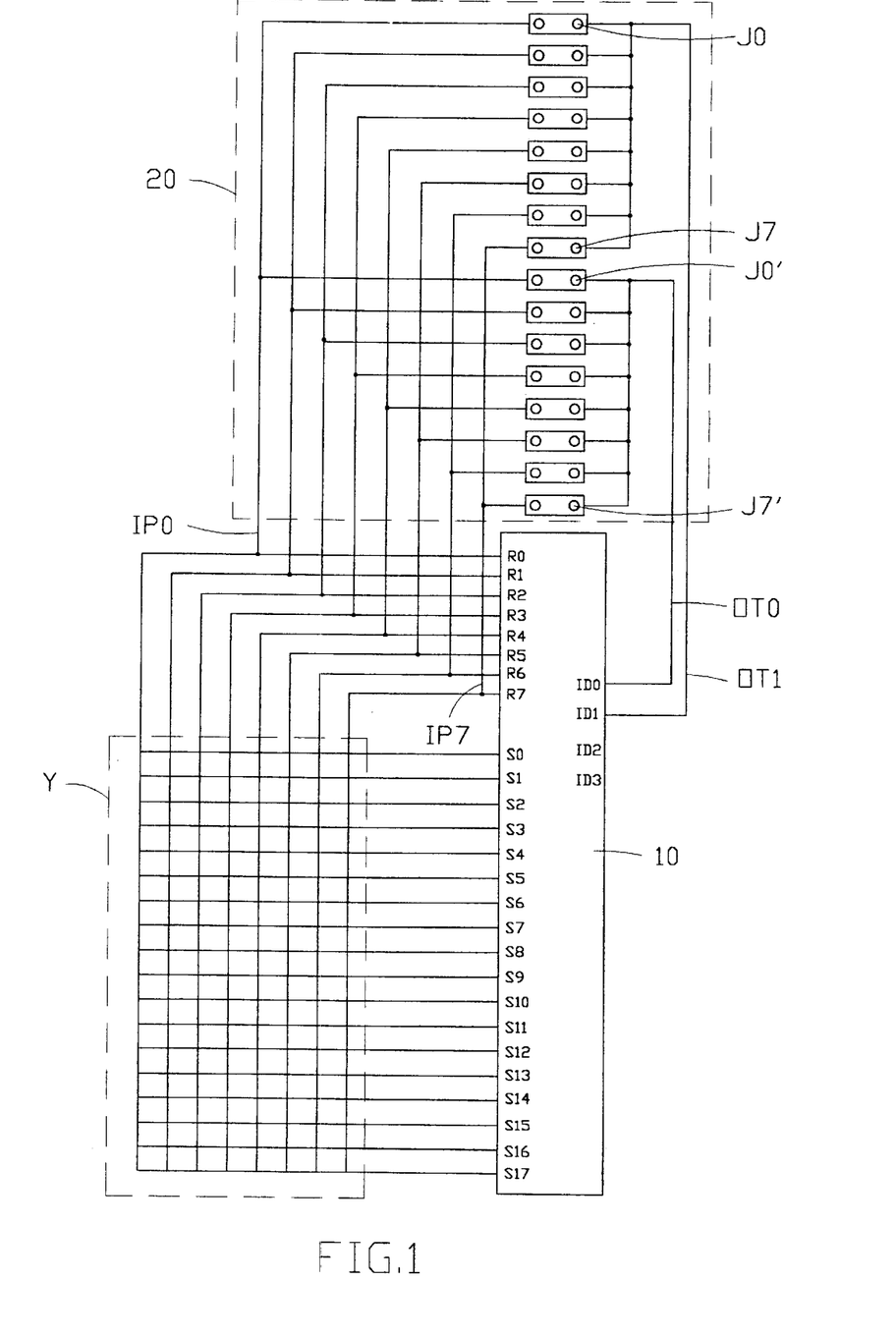
FIG. 1 is a device code recognizing circuit constructed in accordance with a first embodiment of the present invention.

With reference to the drawings and in particular to FIG. 1, wherein a device code recognizing circuit constructed in accordance with a first embodiment of the present invention is shown, the device code recognizing circuit of the present invention comprises a microprocessor 10 having at least one input port having input pins R0–R7 and one output port having output pins S0–S17. The input and output pins R0–R7, S0–S17 intersect each other and form a signal input array Y for reading input signals entered by means of for example keyboard or push button pad. The device code recognizing circuit further comprises a code generation circuit 20 comprising a number of signal input terminals IP0–IP7 corresponding to the input pins R0–R7 of the array Y and a number of signal output terminals OT0–OT1. The number of the signal output terminals OT0–OT1 is two in the embodiment illustrated, but may be varied if desired.

Each of the signal output terminals OT0–OT1 is connected to one unused I/O terminals ID0, ID1 of the microprocessor 10 and is connected to the input pins R0–R7 via jumpers J0–J7, J0'–J7' whereby each I/O terminal ID0–ID1 of the microprocessor 10 is connected to the input pins R0–R7 thereof via the jumpers J0–J7, J0'–J7'.

The operation of the circuit shown in FIG. 1 is that the I/O terminals ID0–ID1 of the microprocessor 10 is sequentially pulled low, namely they are sequentially grounded, while the remaining I/O terminals ID0–ID1 are open thereby being in a high impedance condition, and signals of the input pins R0–R7 are serially read, namely being read one by one. Each I/O terminals ID0–ID1 correspond to 8+1=9 combinations of code, namely open circuit condition of each jumper plus all jumpers closed. Therefore, there are $9^2$=81 combinations of code in this embodiment for there are two I/O terminals ID0, ID1 used. By this way, only two unused I/O terminals ID0, ID1 are used to generate the device code and they do not interfere with the regular operation of the input pins R0–R7 for no high voltage level is applied to the I/O terminals ID0, ID1. In other words, low voltage level and high impedance condition are adapted to represent logic "0" and "1" in the present invention.

Since no high voltage level is generated in the I/O terminals ID0, ID1, there is no need to use diodes to prevent undesired currents as is required by the prior art.

Figure 2:
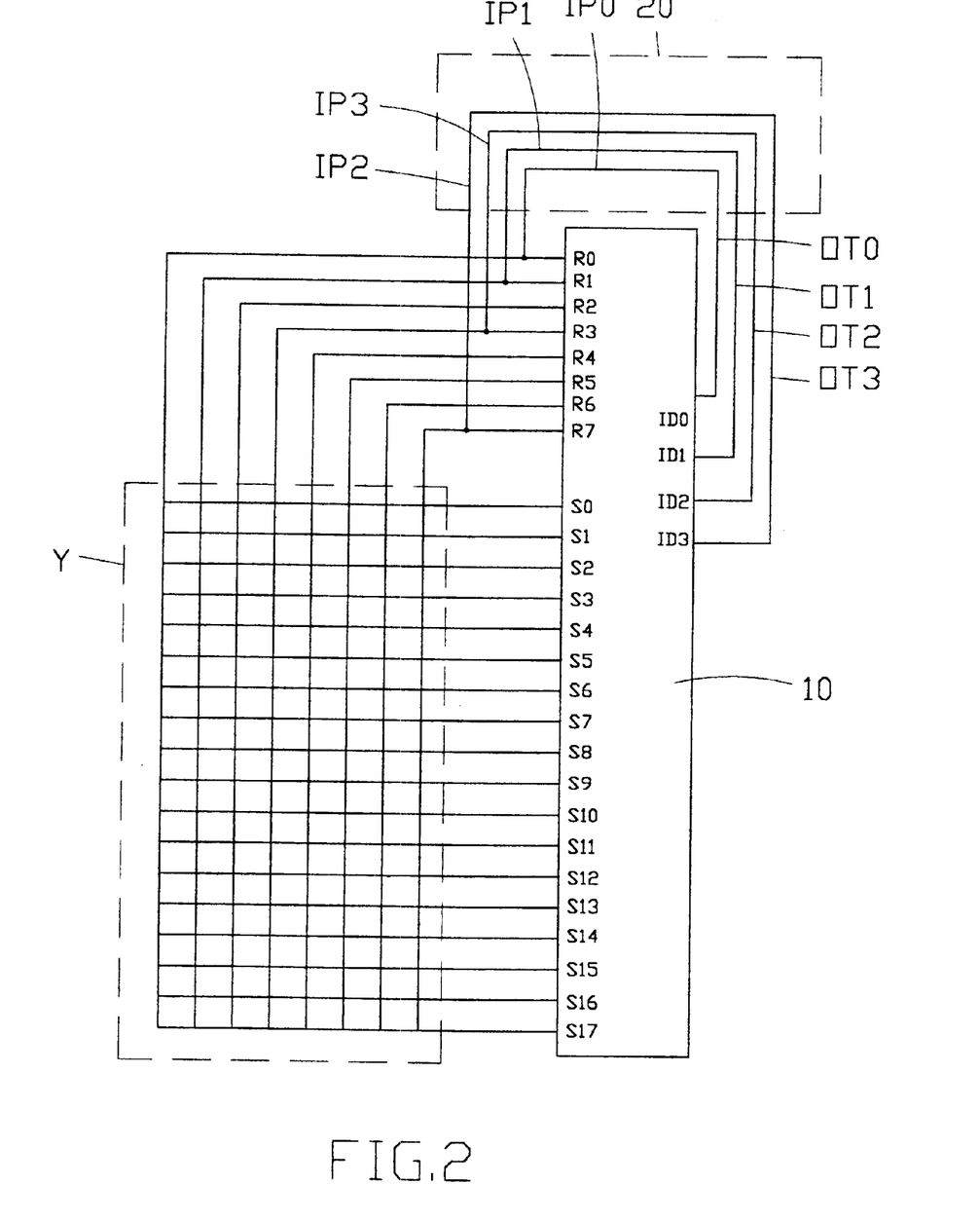
FIG. 2 is a device code recognizing circuit constructed in accordance with a second embodiment of the present invention.

FIG. 2 shows a device code recognizing circuit in accordance with a second embodiment of the present invention. The circuit of the second embodiment circuit makes use of four unused I/O terminals ID0–ID3 of the microprocessor 10. The four I/O terminals ID0–ID3 are connected to signal output terminals OT0–OT3 of the code generation circuit 20 while the signal input terminals IP0–IP3 of the circuit 20 are connected to the input pins R0–R7 of the microprocessor 10. The code generation circuit 20 is shown in a simplified form in FIG. 2 with only the lines shorting the signal output terminals OT0–OT3 to the signal input terminals IP0–IP3 shown in the drawing. The code generation circuit 20 comprises jumpers (not shown in FIG. 2) or other elements to short the four I/O terminals ID0–ID3 to some of the input pins R0–R7. In the embodiment illustrated, the I/O terminals ID0–ID3 are respectively shorted to input pins R0, R1, R3, R7 and the remaining connections therebetween are open. Since four I/O terminals ID0–ID3 of the microprocessor 10 are used, the code generation code 20 may provide $(8+1)^4$= 6561 combinations of code.

Figure 3:
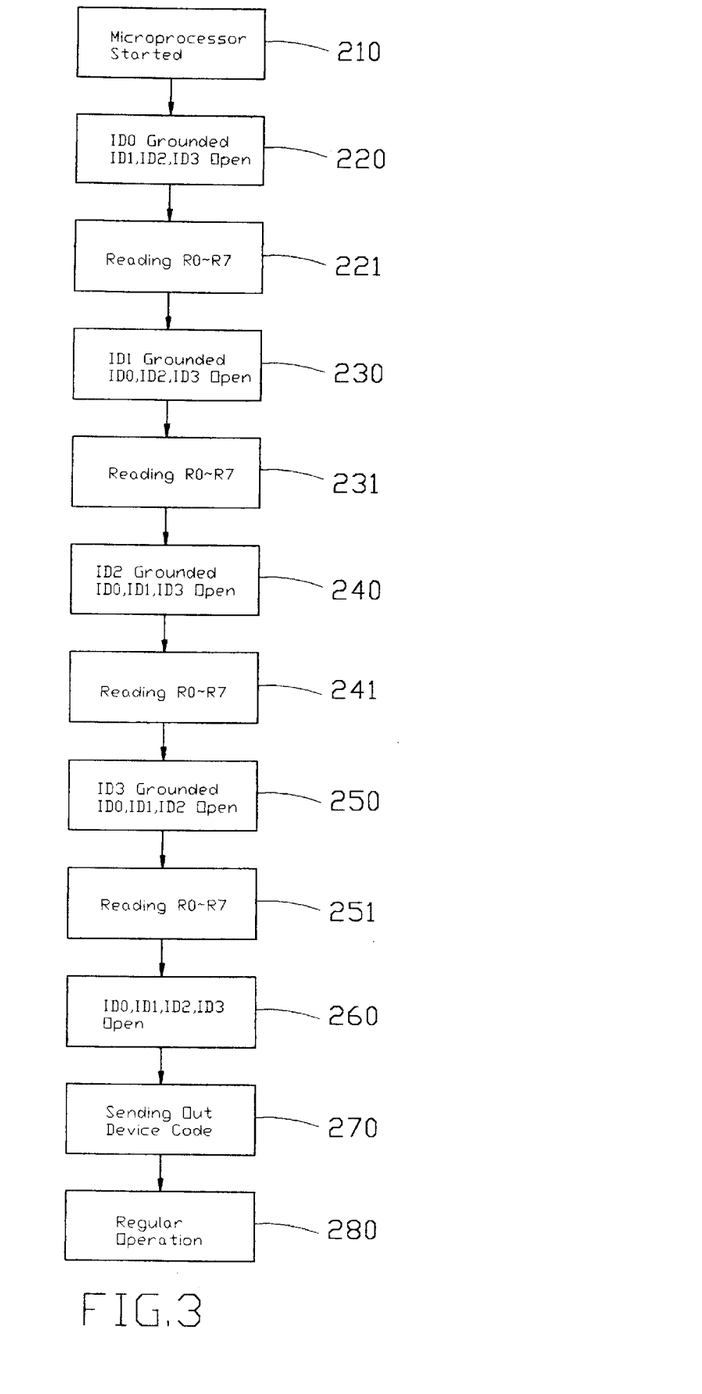
FIG. 3 is an operational flow chart of the device code recognizing circuit of FIG. 2.

FIG. 3 shows an operational flow chart of the device code recognizing circuit of FIG. 2. Quite obviously, it is also applicable to the embodiment shown in FIG. 1. At step 210, the microprocessor 10 is started. To recognize the device code associated with the device in which the microprocessor 10 is mounted, I/O terminal ID0 is grounded by the microprocessor 10 and the remaining I/O terminals ID1–ID3 are open, step 220. The input pins R0–R7 are read by the microprocessor 10, step 221.

Thereafter, I/O terminal ID1 is grounded and the remaining I/O terminals ID0, ID2, ID3 are open, step 230. The input pins R0–R7 are read again by the microprocessor 10, step 231. Thereafter, I/O terminal ID2 is grounded and the remaining I/O terminals ID0, ID1, ID3 are open, step 240. The input pins R0–R7 are read again by the microprocessor 10, step 241.

Thereafter, I/O terminal ID3 is grounded and the remaining I/O terminals ID0–ID2 are open, step 250. The input pins R0–R7 are read again by the microprocessor 10, step 251. To this point, the device code is obtained as one of the 6561 possible combinations of the circuit 20. The code is then sent out to a corresponding processor-based device (not shown) to identify the microprocessor 10 that generates the code, step 270, and then the microprocessor 10 enters a regular operation mode, step 280.

Figure 4:
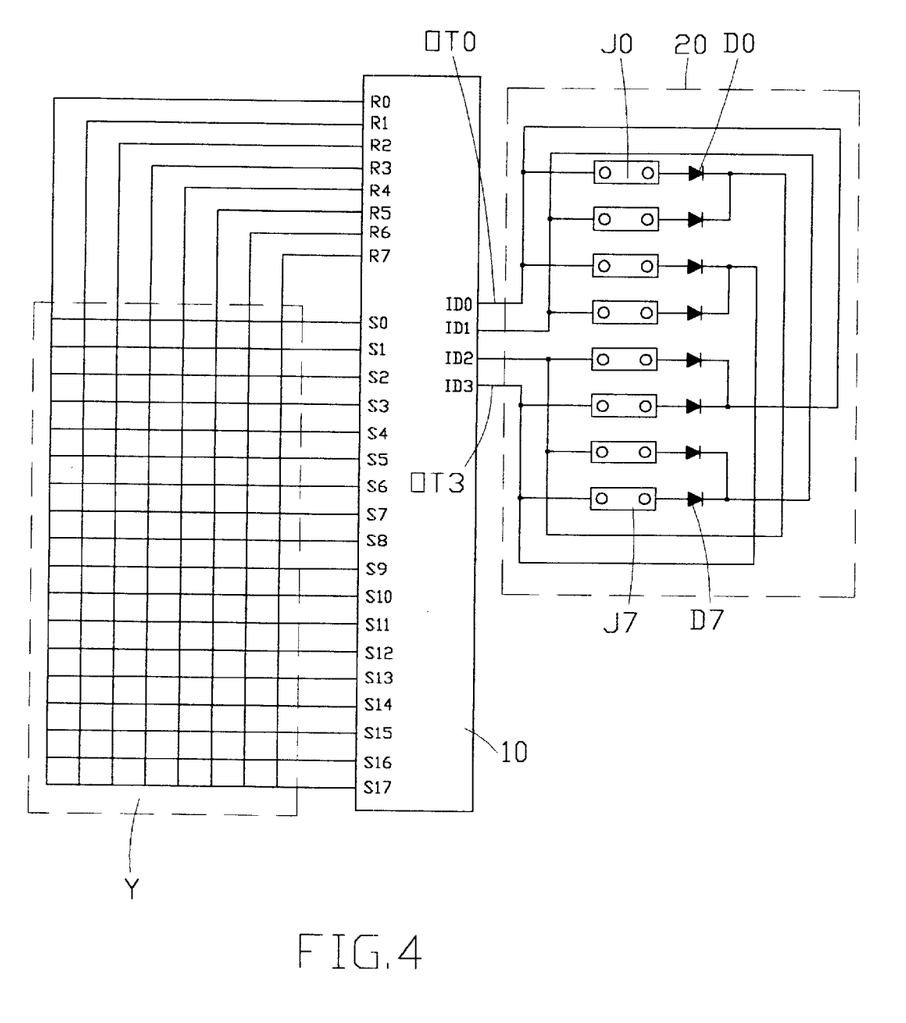
FIG. 4 is a device code recognizing circuit constructed in accordance with a third embodiment of the present invention.

FIG. 4 shows a third embodiment of the present invention wherein the input pins R0–R7 of the array Y of the microprocessor 10 are not involved in the generation and recognition of the device code thereof and only the I/O terminals ID0–ID3 are used in the generation of the device code. The I/O terminals ID0–ID3 are taken as both the signal input terminals IP0–IP3 and the signal output terminals OT0–OT3. The I/O terminals ID0–ID3 are interconnected with each other to form an array similar to the array Y with jumpers J0–J7 and diodes D0–D7 connected between the I/O terminals ID0–ID3. In other words, the I/O terminals ID0–ID3 serve as both signal input terminals IP0–IP3 and signal output terminals OT0–OT3 of the circuit 20. In the embodiment illustrated, I/O terminals ID2, ID3 serve as the signal output terminals with I/O terminals ID0, ID1 as the signal input terminals and vice versa. By this way, only the unused I/O terminals ID0–ID3 are used to generate the device code and interference with the regular operation of the array Y is completely hindered. This embodiment provides 256 possible combinations that is equal to $2^{k*2}$, where $k=(N_{IO}/2)^2$ and $N_{IO}$ is the number of I/O terminals ID0–ID3 and is four in this embodiment.

Figure 5:
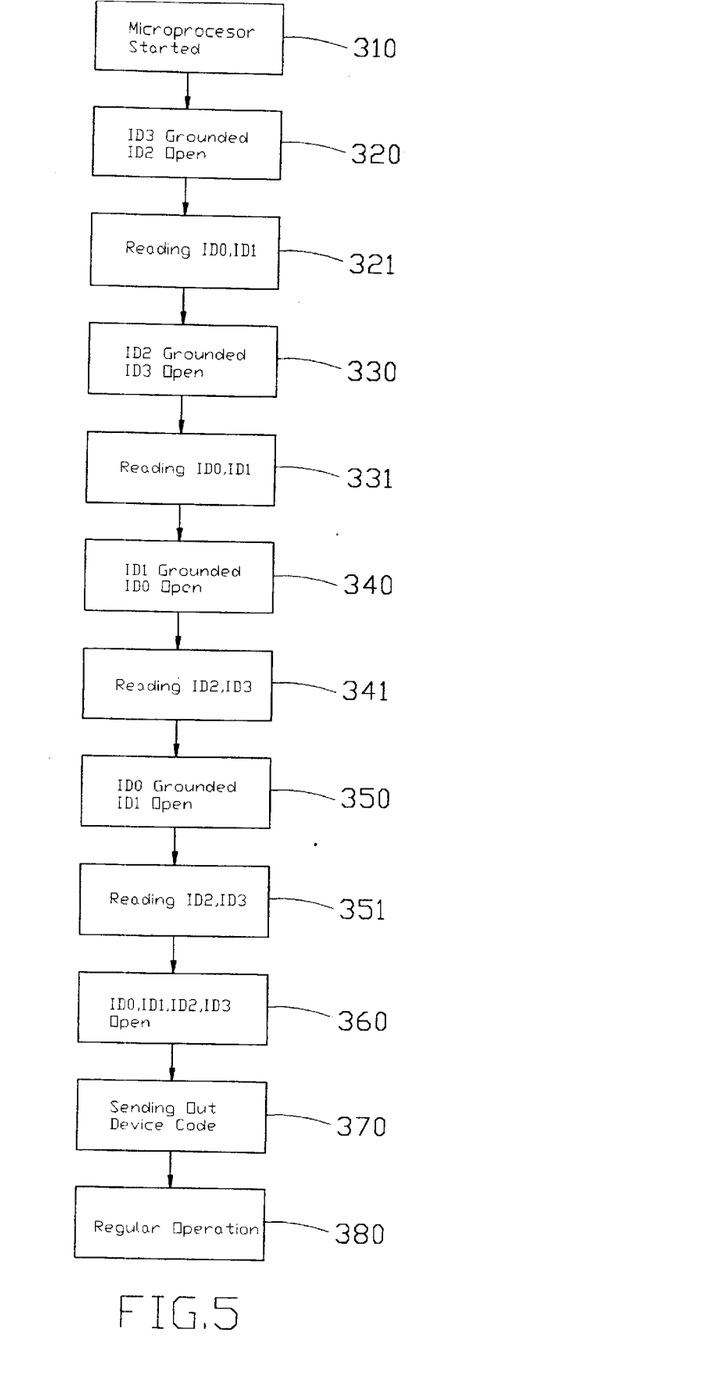
FIG. 5 is an operational flow chart of the device code recognizing circuit of FIG. 4.

FIG. 5 is an operational flow chart of FIG. 4. The microprocessor 10 is started at step 310. ID3 is grounded and ID2 is open, step 320, and ID0, ID1 are read, step 321. Then, ID2 is grounded and ID3 is open, step 330, and ID0, ID1 are read, step 331. Thereafter, ID1 is grounded and ID0 is open, step 340, and ID2, ID3 are read, step 341. Then, ID0 is grounded and ID1 is open, step 350, and ID2, ID3 are read, step 351. Thereafter, all the I/O terminals ID0–ID3 are open, step 360, and the microprocessor 10 sends out the device code associated therewith as one of the 256 possible combinations determined by the jumpers J0–J7, step 370. The microprocessor 10 enters a regular operation mode, step 380, thereafter.

Figure 6:
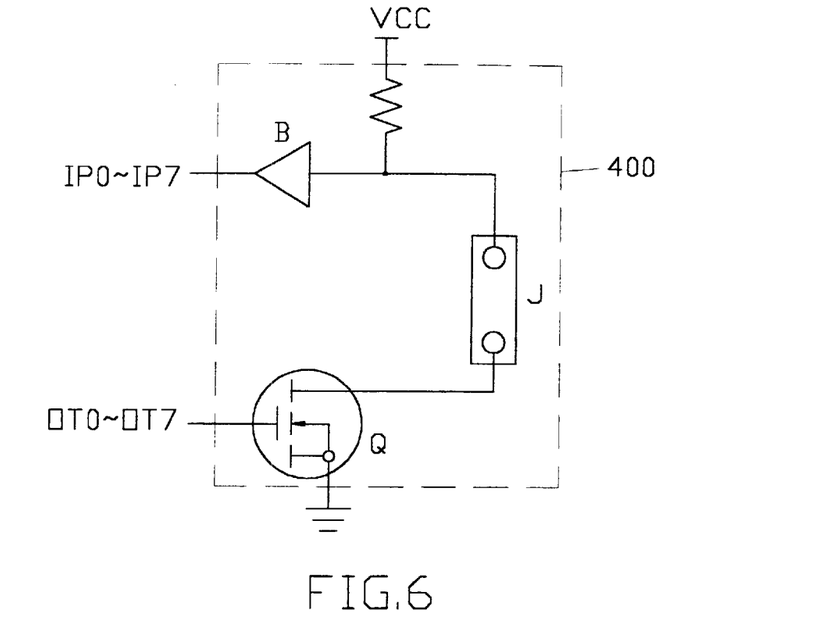
FIGS. 6 and 7 are examples of interface circuits adapted in the present invention.
Figure 7:
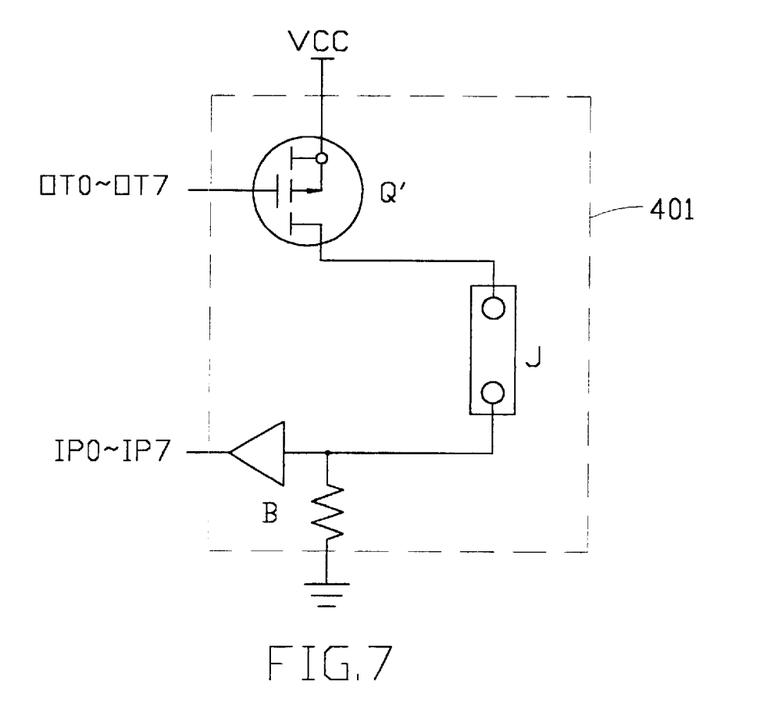

FIGS. 6 and 7 show two examples of an interface circuit 400 connected between each signal input terminal IP0–IP7 and each signal output terminal OT0–OT7. The interface circuits 400 and 401 comprise at least one transistor Q, Q' and at least one buffering element B. In the embodiment of FIG. 6, the transistor Q is an N-channel MOSFET configured as an open drain circuit connected between the corresponding jumper J0–J7, J0'–J7' and the signal output terminal OT0–OT3 (or the I/O terminal ID0–ID3). In the embodiment of FIG. 7, the transistor Q' is a P-channel MOSFET configured as an open drain circuit connected between the corresponding jumper J0–J7, J0'–J7' and the signal output terminal OT0–OT3 (or the I/O terminal ID0–ID3). Such interface circuits 400 and 401 cooperates with the I/O terminals ID0–ID3 that are set to low voltage level or high impedance condition to determine the input signal of the input pins R0–R7.

Although the present invention has been described with respect to preferred embodiments, it is contemplated that a variety of modifications, variations and substitutions may be done without departing from the scope of the present invention that is intended to be defined by the appended claims. For example, the input pins R0–R7, the output pins S0–S17 and the I/O terminals ID0–ID3 mentioned in the above embodiments may be replaced by other terminals of the microprocessor, such as other I/O ports with proper modifications.

What is claimed is:

1. A device code recognizing circuit comprising a microprocessor and a code generation circuit connected to the microprocessor, the code generation circuit comprising signal input terminals connected to input contacts of the microprocessor and signal output terminals connected to I/O terminals of the microprocessor, the signal output terminals being sequentially and selectively set to one of low level condition and high impedance condition and the input contacts of the microprocessor to which the signal input terminals of the code generation circuit are connected serially reading signals from the code generation circuit for provision the signals to the microprocessor.

2. The device code recognizing circuit as claimed in claim 1, wherein the microprocessor comprises input and output ports having input pins and output pins interconnected to each other for forming an array, the input contacts to which the signal input terminals of the code generation circuit are connected being formed by the input pins of the array.

3. The device code recognizing circuit as claimed in claim 1, wherein the input contacts to which the signal input terminals of the code generation circuit are connected are fonned by the I/O terminals of the microprocessor.

4. The device code recognizing circuit as claimed in claim 1, wherein the code generation circuit comprises a jumper connected between each signal output terminal and each signal input terminal.

5. The device code recognizing circuit as claimed in claim 1, wherein the code generation circuit comprises a jumper and a diode serially connected between each signal output terminal and each signal input terminal.

6. The device code recognizing circuit as claimed in claim 1, wherein the code generation circuit comprises interface means connected between each signal output terminal and each signal input terminal.

7. The device code recognizing circuit as claimed in claim 6, wherein the interface means comprises at least one transistor and at least one buffering element.

8. The device code recognizing circuit as claimed in claim 7, wherein the transistor is an N-channel MOSFET.

9. The device code recognizing circuit as claimed in claim 7, wherein the transistor is a P-channel MOSFET.

10. The device code recognizing circuit as claimed in claim 7, wherein the transistor and the buffering element are connected in an open drain configuration.

* * * * *